US008600925B2

(12) United States Patent
Vickers et al.

(10) Patent No.: US 8,600,925 B2
(45) Date of Patent: Dec. 3, 2013

(54) OBJECT-RELATIONAL MAPPED DATABASE INITIALIZATION

(75) Inventors: Arthur John Cerdic Vickers, Redmond, WA (US); Diego Bernardo Vega, Sammamish, WA (US); Rowan Miller, Kirkland, WA (US); Andrew John Peters, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 201 days.

(21) Appl. No.: 13/179,598

(22) Filed: Jul. 11, 2011

(65) Prior Publication Data

US 2012/0331013 A1 Dec. 27, 2012

Related U.S. Application Data

(63) Continuation-in-part of application No. 13/166,825, filed on Jun. 23, 2011.

(51) Int. Cl.
*G06F 17/00* (2006.01)
*G06N 5/02* (2006.01)

(52) U.S. Cl.
USPC ........................................................ 706/50

(58) Field of Classification Search
USPC ........................................................ 706/50
See application file for complete search history.

(56) References Cited

U.S. PATENT DOCUMENTS

| | | | |
|---|---|---|---|
| 6,487,457 B1 | 11/2002 | Hull et al. | |
| 6,999,956 B2 | 2/2006 | Mullins | |
| 7,089,583 B2 | 8/2006 | Mehra et al. | |
| 7,277,435 B2 * | 10/2007 | Keller | 370/390 |
| 7,421,436 B2 | 9/2008 | Salo et al. | |
| 7,657,505 B2 * | 2/2010 | Hejlsberg et al. | 707/999.002 |
| 7,676,493 B2 | 3/2010 | Pizzo et al. | |
| 7,734,659 B2 * | 6/2010 | Lori | 707/802 |
| 7,788,275 B2 * | 8/2010 | Warren et al. | 707/763 |
| 8,150,882 B2 * | 4/2012 | Meek et al. | 707/792 |
| 8,392,462 B2 * | 3/2013 | Meek et al. | 707/792 |
| 8,438,532 B2 * | 5/2013 | Fox et al. | 717/101 |
| 2009/0024652 A1 | 1/2009 | Thompson et al. | |
| 2010/0100427 A1 | 4/2010 | McKeown et al. | |

OTHER PUBLICATIONS

"Productivity Improvements for the Entity Framework", Retrieved from <<http://blogs.msdn.com/b/efdesign/archive/2010/06/21/productivity-improvements-for-the-entity-framework.aspx?PageIndex=2>>, Jun. 21, 2010, 7 Pages.

(Continued)

*Primary Examiner* — Michael B Holmes
(74) *Attorney, Agent, or Firm* — Ogilvie Law Firm

(57) ABSTRACT

A balance is provided between automation of repetitive database creation and configuration efforts, on the one hand, and flexibility to depart from prior configurations, on the other hand, to assist developers with aspects of database initialization. An application domain includes data context instances, database connections, object models mapped by an object-relational mapper, and database initializers. Upon the first attempted runtime use of a particular database connection—data context instance—object model combination, a database initializer is invoked. Initializers may check to see if the database exists, (re)generate a database and schema based on the object model, determine whether the database is compatible with the current object model, delete the database and its schema, seed data, modify database indexes, and/or migrate an existing database, for example. A custom initializer can run developer-supplied code as desired to place the database in a known state for use by the application.

20 Claims, 3 Drawing Sheets

(56) References Cited

OTHER PUBLICATIONS

Kraig Brockschmidt et al., "Microsoft Data Development Technologies: Past, Present, and Future", Retrieved from <<http://msdn.microsoft.com/en-us/library/ee730343(d=printer).aspx>>, Sep. 2010, 18 Pages.

"Object and Relational Mapping (ORM) With Hibernate", Retrieved from <<http://www.jboss.com/pdf/HibernateBrochure-03_07.pdf>>, Jun. 29, 2011 (Retrieved Date), 4 Pages.

Jeff Prosise, "Supporting Database Cache Dependencies in ASP. NET", Retrieved from <<http://msdn.microsoft.com/en-us/magazine/cc188758(printer).aspx>>, Apr. 2003, 7 Pages.

"EF Feature CTP4 Released!", Retrieved from <<http://blogs.msdn.com/b/adonet/archive/2010/07/14/ctp4announcement.aspx>>, Jul. 14, 2010, 5 Pages.

José Blakeley et al, "Next-Generation Data Access: Making the Conceptual Level Real", Retrieved from <<http://msdn.microsoft.com/en-us/library/aa730866%28v=vs.80%29.aspx>>, Jun. 2006, 22 Pages.

"FAQ :: Castle Project", Retrieved from <<http://www.castleproject.org/activerecord/faq.html>>, Retrieved Jul. 9, 2011, 4 Pages.

"LLBLGen Pro overview", Retrieved from <<http://www.llblgen.com/Pages/overview.aspx>>, Retrieved Jul. 9, 2011, 3 Pages.

"List of object-relational mapping software—Wikipedia, the free encyclopedia", Retrieved from <<http://en.wikipedia.org/wiki/List_of_object-relational_mapping_software>>, Jul. 4, 2011, 5 Pages.

Scott Guthrie, "Announcing Entity Framework Code-First (CTP5 release)—ScottGu's Blog", Retrieved from <<http://weblogs.asp.net/scottgu/archive/2010/12/08/announcing-entity-framework-code-first-ctp5-release.aspx>>, Dec. 8, 2010, 40 Pages.

Mario Aquino, "A Simple Data Access Layer using Hibernate", Retrieved from <<http://www.cnblogs.com/sunsonbaby/archive/2004/12/31/84998.html>>, copyright date 2003, 14 Pages.

"OpenAccess Features", Retrieved from <<http://www.telerik.com/products/orm/features.aspx>>, Jun. 29, 2011 (retrieved date), 13 Pages.

Jeremy Miller, "Design Patterns for Data Persistence", Retrieved from <<http://msdn.microsoft.com/en-us/magazine/dd569757(printer).aspx>>, Jun. 29, 2011 (retrieved date), 8 Pages.

"What is new in the Version 6.1 Feature Pack for EJB 3.0", Retrieved from <<http://publib.boulder.ibm.com/infocenter/wasinfo/v6r1/index.jsp?topic=/com.ibm.websphere.ejbfep.multiplatform.doc/info/ae/ae/welc_newinreleaseejbfp.html>>, Jun. 29, 2011 (Retrieved Date), 5 Pages.

"ADO.NET Entity Framework—Wikipedia, the free encyclopedia", Retrieved from <<http://en.wikipedia.org/wiki/ADO.NET_Entity_Framework>>, May 26, 2011, 10 Pages.

Arthur Vickers, "Code First: Inside DbContext Initialization", Retrieved from <<http://blog.oneunicorn.com/2011/04/15/code-first-inside-dbcontext-initialization/>>, Apr. 15, 2011, 5 Pages.

"EF 4.1 Code First Walkthrough", Retrieved from <<http://blogs.msdn.com/b/adonet/archive/2011/03/15/ef-4-1-code-first-walkthrough.aspx>>, Mar. 15, 2011, 8 Pages.

Martin Fowler, "FluentInterface", Retrieved from <<http://martinfowler.com/bliki/FluentInterface.html>>, Dec. 20, 2005, 3 Pages.

"Object database—Wikipedia, the free encyclopedia", Retrieved from <<http://en.wikipedia.org/wiki/Object_database>>, Jun. 16, 2011, 6 Pages.

"Object-relational mapping—Wikipedia, the free encyclopedia'", Retrieved from <<http://en.wikipedia.org/wiki/Object-relational_mapping>>, Jun. 23, 2011, 3 Pages.

Edward Hieatt and Rob Mee, "Repository", Retrieved from <<http://www.martinfowler.com/eaaCatalog/repository.html>>, Jul. 1, 2011 (retrieved data), 2 Pages.

"Unit of Work", Retrieved from <<http://www.martinfowler.com/eaaCatalog/unitOfWork.html>>, Jul. 1, 2011 (retrieved data), 2 Pages.

"Persistence (computer science)—Wikipedia, the free encyclopedia", Retrieved from <<http://en.wikipedia.org/wiki/Persistence_(computer_science)>>, May 9, 2011, 3 Pages.

"Using DbContext in EF 4.1 Part 5: Working with PropertyValues", Retrieved from <<http://blogs.msdn.com/b/adonet/archive/2011/01/30/using-dbcontext-in-ef-feature-ctp5-part-5-working-with-property-values.aspx>>, Jan. 30, 2011, 9 Pages.

"Using DbContext in EF 4.1 Part 6: Loading Related Entities", Retrieved from <<http://blogs.msdn.com/b/adonet/archive/2011/01/31/using-dbcontext-in-ef-feature-ctp5-part-6-loading-related-entities.aspx>>, Jan. 31, 2011, 7 Pages.

"When is Code First not code first?", Retrieved from <<http://blogs.msdn.com/b/adonet/archive/2011/03/07/when-is-code-first-not-code-first.aspx>>, Mar. 7, 2011, 4 Pages.

* cited by examiner

OBJECT-RELATIONAL MAPPED DATABASE INITIALIZATION

CROSS REFERENCE TO RELATED APPLICATIONS

This application is related to the following applications: U.S. patent application Ser. No. 13/166,825 filed 23 Jun. 2011 entitled "Conventions for Inferring Data Models", as well as the following applications co-filed with the present application: U.S. patent application Ser. No. 13/179,914 filed Jul. 11, 2011, U.S. patent application Ser. No. 13/179,601 filed Jul. 11, 2011, and U.S. patent application Ser. No. 13/179,629 filed Jul. 11, 2011.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Object-relational mapping can be used to convert data between an object model of an object-oriented program and a relational database. The mapping is performed, at least in part, by a tool known as an object-relational mapper. The acronym ORM is used herein to denote the mapping tool, the mapping itself, or both.

An ORM is useful because data in the object model is organized in non-scalar items, whereas data in the relational database is organized in scalar items. Integers, floating point values, and strings are examples of scalar values; structs, records, and object instances are examples of non-scalar values. An object model includes objects (class instances) which are frequently non-scalar values. In addition to multiple associated data values, an object may have associated methods, such as methods to set or get the data values or perform other operations. Many familiar database systems, including many structured query language database management systems, store and manipulate only scalar values, which are organized within tables. An ORM helps convert object values into groups of scalar values for storage in the database, and convert those scalar values back into objects upon retrieval from the database. Thus, an ORM helps translate a logical representation of objects into a form that can be stored in a database, without losing track of object properties and inter-relationships.

SUMMARY

In the course of developing a product which uses object-relational mapping, a developer can benefit both from automation and from customization. In particular, developers may be assisted by striking a balance between automation of repetitive database creation and configuration efforts, on the one hand, and flexibility to depart from prior configurations, on the other hand. Some embodiments described herein help provide such a balance.

Specifically, some embodiments assist developers with aspects of database initialization. For example, consider an application domain or other environment which includes data context instances (also known as ORM sessions, or units of work), database connections, object models which are mapped by an object-relational mapper, and database initializers. Some embodiments watch for the first attempted use at runtime of (i) a particular database connection with (ii) a particular data context instance and (iii) a particular object model of an application. When this first runtime use occurs, a database initializer is automatically invoked. The database initializer may be a default initializer or a custom initializer; default initializers are provided by the development environment, whereas custom initializers are provided by a developer.

One default initializer checks to see if the database exists. If it does not exist, then the database and schema are automatically generated, based on the object model. If the database does exist, then the default initializer may be finished, but variations are also possible.

In one variation, the initializer also determines whether the database is compatible with the current object model, by comparing the object model to the database's schema using familiar object-relational mapper techniques. This comparison may be optimized by generating a model-hash from part (database section) of the current object model and comparing it to a schema-hash previously generated from the database schema. If the hashes do not match or if the database and the model are otherwise incompatible, then the initializer deletes the database and its schema, and generates a replacement database and schema that is compatible with the model.

In another variation, the database and schema are always deleted and recreated by the initializer, without checking for compatibility with the object model. This can be desirable, for example, when the database is subject to destructive tests, so that the database can be reset to a known state before each test run.

In another variation, the database and schema are always deleted and recreated if the model has changed. If the model has not changed, the database initializer may seed data, or it may simply exit.

In some embodiments, the default initializer may also call a custom initializer or be followed by a custom initializer; in yet other embodiments, only the custom initializer is called. Either way, a custom initializer can use developer-provided code to do any or all of the following, for example: modify database indexes; migrate an existing database and schema to match the data model and retain the existing data; seed the database with data from any specified source.

More generally, a custom initializer can run developer-supplied code as desired to place the database in a certain state for use by the application. The developer-supplied code overrides default code for initialization, or else supplements that default code, as commanded by the developer.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
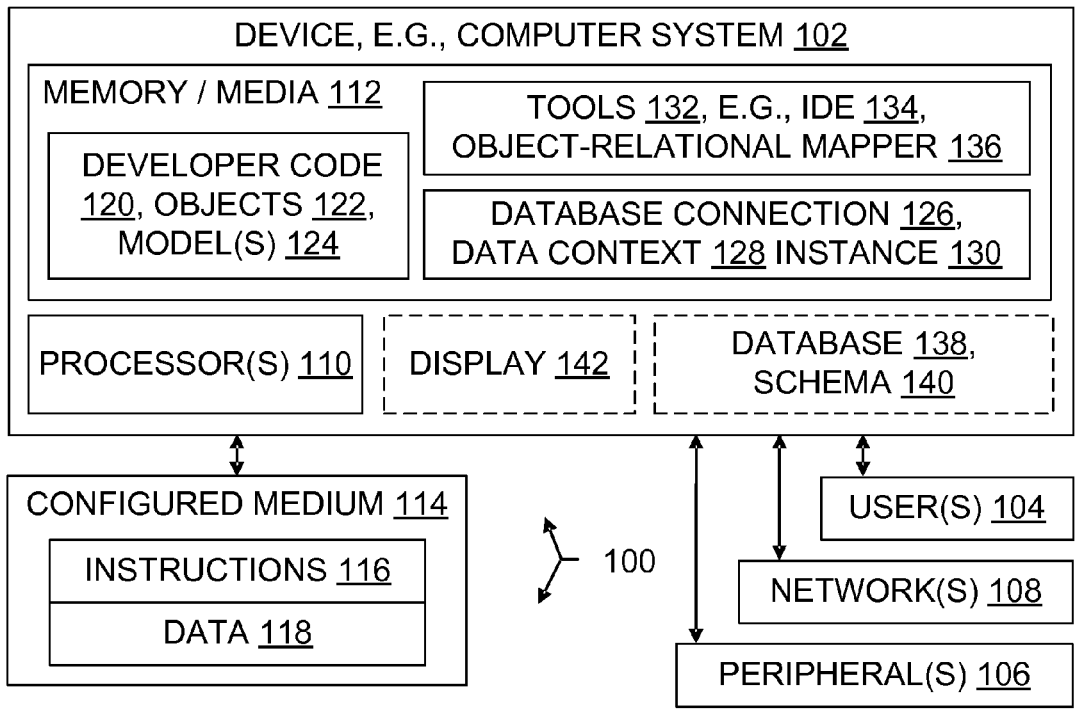
FIG. 1 is a block diagram illustrating a computer system having at least one processor, at least one memory, an object-relational mapper and/or an object-relational mapping (ORM), an object model, and other items in an operating environment which may be present on multiple network nodes, and also illustrating configured storage medium embodiments.

An application in a general-purpose programming language may use a conceptual data model mapped to a relational database for data storage. Developing such an application may involve complex configuration and many steps. In some familiar approaches, application developers explicitly set up these configurations, and manually go through many or all of the steps. This places a heavy burden on a developer to understand the steps and configuration called for, to make appropriate choices, and to implement everything.

Some embodiments described herein help reduce that burden. Embodiments may be part of a solution which uses conventions and best practices to automate creation of data access aspects of an application in a general-purpose programming language, in which the application uses a conceptual data model mapped to a relational database for data storage. A developer can write a few simple classes, and then the other steps and configuration happen automatically when the application is run. Such solutions may include discovering the object model, building a data model from this object model, caching the data model, mapping the data model to a relational database, creating a connection to the database, and creating and initializing the database as desired. For each of these steps, a solution may allow the application developer to override the conventions and automation, making the solution useful for many different types of application even when the defaults for some aspects are customized. Specifically, embodiments described herein may be used to run a database initializer the first time the connection is made such that the database can be initialized, and to manage database existence and content through database generation, compatibility checks, seeding, deletion, and regeneration according to defaults and/or developer preferences.

Some embodiments described herein may be viewed in a broader context. For instance, concepts such as databases, initialization, runtime, objects, and/or compatibility may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and methods involving databases, initialization, runtime, objects, and/or compatibility are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

A "data context" (sometimes referred to as a "data context instance", although the class vs. instance distinction may be made) can be described as a primary entry point to an object-relational mapper. The data context manages a connection to a database. Using this connection the context allows data to be queried from the database and materialized into objects. The context keeps track of modifications to these objects, allows for adding new objects and deleting existing objects, and orchestrates the writing of these changes back to the database. The context also provides mechanisms to examine the objects that are being tracked and the relationships between them and to manipulate these objects, their state, and their relationships.

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine. However, "automatically" does not necessarily mean "immediately".

Throughout this document, use of the optional plural "(s)" or "(es)" means that one or more of the indicated feature is present. For example, "index(es)" means "one or more indexes" or equivalently "at least one index".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as ascertaining, attempting, checking, configuring, defining, detecting, determining, executing, finding, generating, invoking, migrating, modifying, obtaining, overriding, seeding, selecting, specifying, supplementing, supplying, verifying, (or ascertains, ascertained, attempts, attempted, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106. System administrators, database administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, and/or optical media, as opposed to media such as a wire that merely propagates a signal. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed as discussed herein, e.g., by creation, deployment, display, execution, mapping, modification, seeding and/or other operations.

Developer code 120 with objects 122 and a model 124, a database connection 126, a data context 128 class instance 130, tools 132 such as an IDE 134 and an object-relational mapper 136, other software, and other items shown in the Figures and/or discussed in the text may reside partially or entirely within one or more media 112, thereby configuring those media. It will be understood that distinctions may be made between data models and object models, but for convenience herein model 124 denotes a data model, a corresponding object model, or both. A database 138 and associated schema 140 (considered in some approaches to be part of the database) may be present on one or more machines in the system 102. In addition to processors 110 and memory 112, an operating environment may also include other hardware such as displays 142, buses, power supplies, and accelerators, for instance.

In some embodiments, the data context 128 takes the form of a Microsoft® DbContext class, which provides the main entry point for working with the Object/Relational Mapper 136 in Microsoft's Entity Framework technology (version 4.1), for example (mark of Microsoft Corporation). The data context 128 instance 130 implements a familiar Unit of Work pattern and also includes elements of a familiar Repository pattern. As the distinction between a class and its instances will generally be understood, however, for convenience the data context and its instances are collectively referred to herein as the data context or as data context 128.

As indicated, a given operating environment 100 may include an Integrated Development Environment (IDE) 134 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with endeavors outside the field of software development per se that use ORM applications.

Items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

To further illustrate the operating environment of some embodiments, several aspects of a more comprehensive solution will now be discussed, with the understanding that not every feature or capability discussed is necessarily present in a given embodiment.

User Classes

As part of creating an application an application developer 104 creates an object model 124 containing data classes for objects 122, and a data context 128. For example, a simple data model 124 might consist of two entity types-one representing products and the other representing categories to which products belong. Using C# developer code 120 as an example (the programming language is not dispositive), the classes might look like this:

```
public class Product
{
    public int Id { get; set; }
    public string Name { get; set; }
    public Category Category { get; set; }
}
public class Category
{
    public string Id { get; set; }
    public ICollection<Product> Products { get; set; }
}
```

The exact nature of the classes is not important. These are simple classes that do not derive from any special base type, implement any interfaces, or have any required attributes, and that use simple automatic properties. These classes represent the object model 124 for the application.

In an Entity Framework environment, the application developer also writes a data context 128 that derives from the provided DbContext base class. For example:

```
public class MyContext : DbContext
{
    public DbSet<Product> Products { get; set; }
}
```

This developer code 120 is sufficient to create the data access part of an application. Also, the application developer can avoid adding any other configuration to non-code files. For example, adding a connection string to the application configuration file can be skipped.

Initialization of the Data Context DbSet Properties

When an instance of the data context (e.g. MyContext) is created it is scanned for all DbSet properties that have public set methods to assign values. Each of these methods is called automatically to set the property to an instance of the implicated collection or other group. This removes the burden from the application developer of creating and setting DbSet instances for their data context and allows the context to be written with simple automatically identified properties. The application developer can disable automatic initialization of sets for some or all sets if the application needs to use some special form of initialization.

Discovering the Database Connection

The first time that an instance of the data context (e.g. MyContext) is used a connection 126 to an underlying database 138 is created. If no configuration is supplied then a convention is used to create the connection. A default convention uses the name of the context as the database name and connects to an instance of SQL Server® Express edition or another database management solution running on the local machine (mark of Microsoft Corporation). This convention can be changed to create connections to any other type of database for which an Entity Framework provider is available, on any machine, for example. The convention can be overridden by the application developer in a number of ways, such as allowing a connection from the application's configuration file to be used.

Discovering the Data Model

The first time that an instance 130 of the data context (e.g. MyContext) is used, the data model 124 for that context 128 is discovered automatically. The data model 124 used can be an Entity Data Model (EDM) as supported by the Microsoft® Entity Framework, or another form of data model could be used. If the connection created contains a data model specification already, then the data model 124 specified is used and data model discovery ends.

If the connection does not contain a data model specification, then the DbSet properties of the data context 128 are used as the basis for discovering an object model 124 which is then in turn used to create a data model 124. The generic type of each DbSet property is used to define an entity type of the object model. For example, using MyContext defined above, the type Product is discovered as an entity type in the model. Discovery mechanisms are then used to discover the remainder of the object model and create a data model from it. Known mechanisms may be used such that all types, properties, and relationships of the model 124 are discovered. For example, using the object model above, Category is also discovered as an entity type through its reachability from Product. In this example, the object model discovered and the data model created from it therefore include the Product and Category entity types, the relationship between these types, and the properties of these types.

The application developer may be allowed to make changes to the data model 124 before it is finalized. This allows application developers to use as much of the automatic mechanism as possible and only make changes where their goals are different from the defaults. Notably, a developer is not called on to configure everything manually merely because some aspect of their model does not match the defaults.

Caching the Data Model

In some cases, the data model created by the above steps is cached in an application-domain-wide cache, keyed by the type of the application's data context. This cache is checked each time that an instance 130 of the context is created, and if a data model 124 is found in the cache then it is used instead of going through the entire discovery process again. This caching helps ensure that applications run fast enough while using the steps described above. An application developer can create and cache the data model manually if the default model discovery and caching does not meet the developer's goals.

Initializing the Database

The application developer can set a database initializer to be run the first time an instance of a data context 128 is used with a given model and connection in the application domain (Common Language Runtime application domains and appdomains are examples of an application domain). In some embodiments, the default initializer automatically creates the database and schema if it does not already exist. However, different initializers can be configured to allow actions such as: creating the database 138 and/or schema 140 automatically; tweaking the database by configuring options such as indexes; migrating an existing database and schema to match the data model; or seeding the database with data. In general, custom initializers may perform any actions the application developer indicates, to get the database into a state where it can be used by the application. Database initialization can also be disabled if it is not appropriate for the application.

With a solution along the lines described above, an application developer merely writes simple classes for the data model and data context and then uses an instance of that context in order to create a fully functional application backed by a relational database. In addition, the developer can easily intercede at any point in the development process to add customizations as appropriate for their application. Such ease and flexibility can provide significant benefits in the creation of data applications.

Systems

Figure 2:
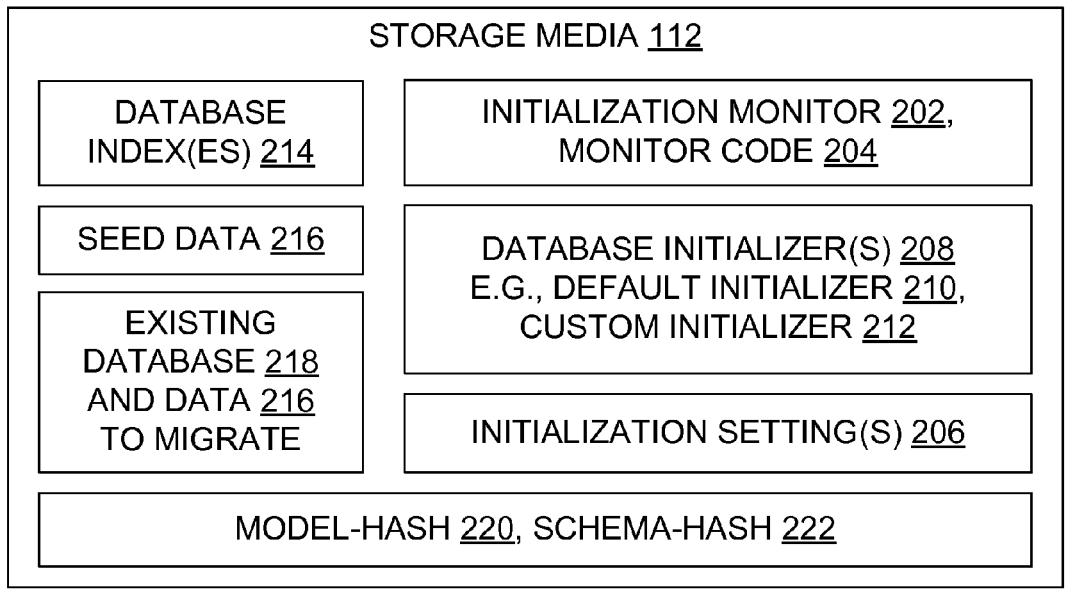
FIG. 2 is a block diagram illustrating ORM database initialization in an example architecture.

FIG. 2 illustrates an architecture which is suitable for use with some embodiments. An initialization monitor 202 watches an application domain or other portion of an operating environment 100 for the first runtime use of a database connection 126 together with a data context instance 130 and an object model 124 (or equivalently, a data model 124). The initialization monitor includes software code 204, and also includes or otherwise utilizes initialization settings 206 which specify, for example, when a database 138 should be deleted and regenerated. The initialization monitor code calls (i.e., invokes) one or more database initializers 208, which may be default initializers 210 (those generally supplied by the system) or custom initializers 212 (those generally supplied by a developer 104).

The custom—default distinction is not the only distinction one can make; initializers 208 can also be categorized according to their behavior. Default initializers and custom initializers alike may go beyond merely checking for database existence and creating a database. For example, initializers 208 may modify database indexes 214, seed data 216 into a database, and/or migrate an existing database 138, 218 and its data 216 into another database. A model-hash 220 and/or a schema-hash 222 may also be used by an initializer 208 to detect changes in the model 124 and/or to ascertain incompatibility of a database 138 and a model 124.

With reference to FIGS. 1 and 2, some embodiments provide a computer system 102 with a logical processor 110 and a memory medium 112 configured by circuitry, firmware, and/or software to transform an operating environment by database initialization management as described herein.

Some embodiments include a computer system with a logical processor 110, a memory 112 in operable communication with the logical processor, a data context instance 130 residing in the memory, a database connection 126 residing in the memory, an object model 124 residing in the memory (the object model having been mapped by an object-relational mapper 136), and an initialization monitor 202 residing in the memory. The initialization monitor has code 204 which (upon execution) monitors for a first attempted use at runtime of the database connection 126 with the data context instance 130 and the object model 124.

Some embodiments further include a database initializer 208 which resides in the memory and is invocable by the initialization monitor 202. In some of these embodiments, the database initializer includes a default initializer 210, namely, one that is free of code supplied by a developer of the object model. In some, the database initializer includes a custom initializer 212 that contains code supplied by a developer of the object model.

Some embodiments also include (residing in the memory) a model-hash 220 of at least a portion of the object model, a schema-hash 222 of at least a portion of a schema 140 of a database, or both. The monitor code 204 uses the hash(es) to find out whether the model 124 has changed since the last time the initializer ran, to ascertain whether the model 124 and the database 138 (and its schema 140) are compatible with each other, or both.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, databases 138 may be stored on multiple devices/systems 102 in a networked cloud, the object-relational mapper 136 may be stored on yet another device within the cloud, and the application code 120 under development may configure the display on yet other cloud device(s)/system(s) 102.

Processes

Figure 3:
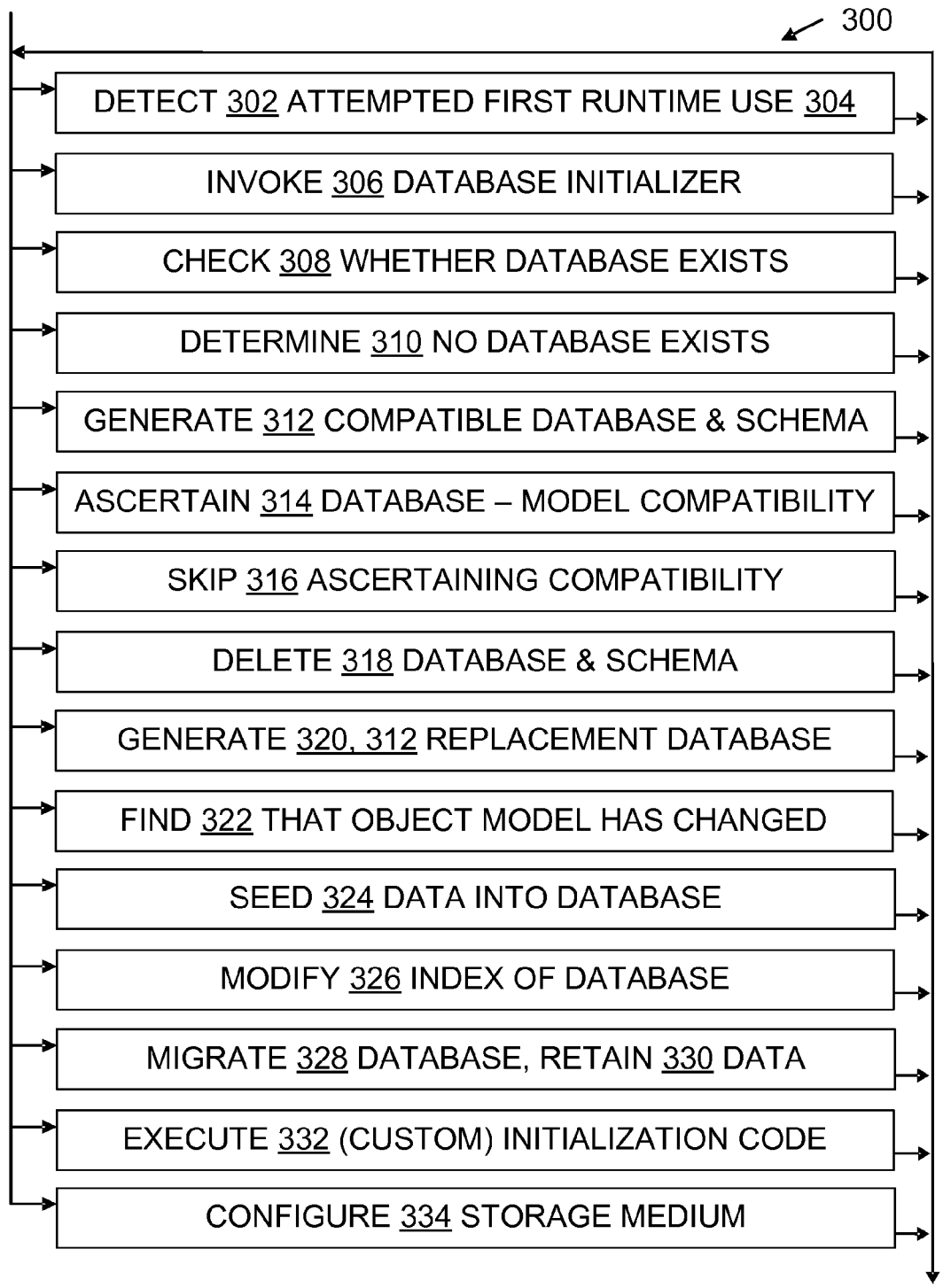
FIG. 3 is a flow chart illustrating steps of some process and configured storage medium embodiments from a database initialization tool perspective.
Figure 4:
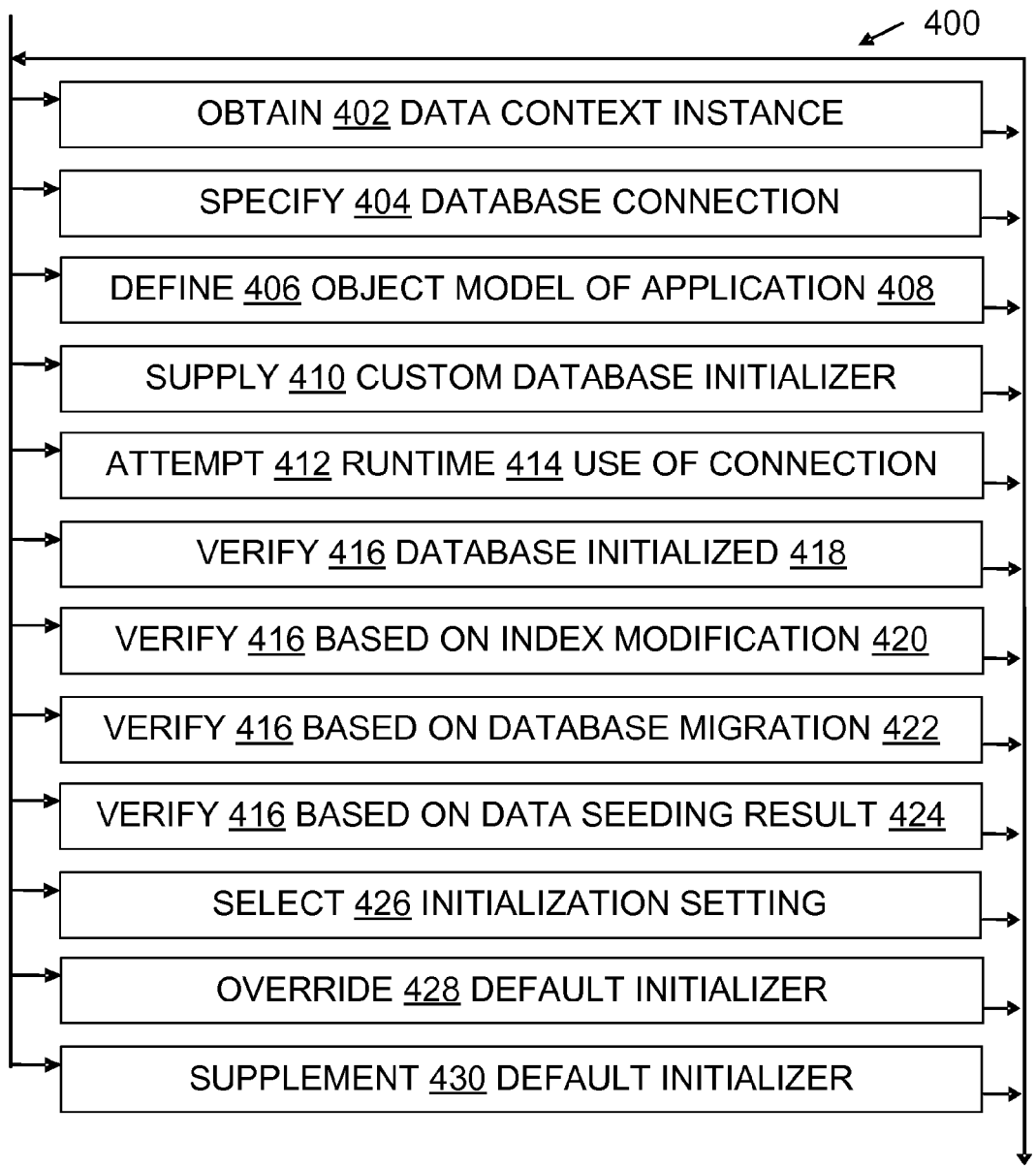
FIG. 4 is a flow chart illustrating steps of some process and configured storage medium embodiments from a developer perspective.

FIGS. 3 and 4 each illustrate some process embodiments, in respective flowcharts 300 and 400. Processes shown in the Figures may be performed in some embodiments automatically, e.g., by an initialization monitor 202 and database initializer 208 driven automatically by the launching of an application under development, in an IDE 134 or elsewhere. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIGS. 3 and 4. Steps may be performed serially, in a partially overlapping manner, or fully in parallel. The order in which flowchart 300 and/or flowchart 400 is traversed to indicate the steps performed during a given process may vary from one performance of the process to another performance of the process. The flowchart(s) traversal order may also vary from one process embodiment to another process embodiment. Steps from either or both flowcharts may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a use detecting step 302, an embodiment detects an attempted first runtime use 304 of a database connection 126 with a data context instance 130 and an object model 124. Step 302 may be accomplished by using flags to distinguish first uses from subsequent uses, by using call stacks or kernel data structures to distinguish application code 120 runtime from other times, and/or by using other mechanisms, for example.

During an initializer invoking step 306, an embodiment invokes a database initializer 208. Familiar control-passing and other invocation mechanisms may be used.

During an existence checking step 308, an embodiment checks whether a database 138 exists for the database connection 126 of step 302. Familiar file system calls, status APIs, database management system queries and/or other mechanisms may be used.

During a non-existence determining step 310, an embodiment determines that no database 138 exists for the database connection 126 of step 302. Mechanisms of step 308 may be used.

During a database generating step 312, an embodiment generates a database 138 and/or its schema 140, such that they are compatible with the model of step 302. Familiar ORM and database management system mechanisms may be used.

During a compatibility ascertaining step 314, an embodiment ascertains whether a database 138 (and/or its schema 140 specifically) is compatible with the model of step 302. Familiar ORM mechanisms may be used.

During a compatibility ascertainment skipping step 316, step 314 is specifically skipped. That is, a process containing step 316 proceeds without any reliance on compatibility or lack thereof between a database 138 (and/or its schema 140 specifically) and the model of step 302.

During a database deleting step 318, a database 138 and its schema 140 are deleted. Familiar database management system mechanisms may be used.

During a replacement database generating step 320, an embodiment generates 312 a database 138 and/or schema 140 to replace ones that were deleted 318. Step 312 mechanisms may be used.

During a change finding step 322, an embodiment finds that a model 124 has changed since the last time an initializer 208 could have run for a process instance containing step 302. Step 322 may be accomplished by using familiar hash mechanisms to form a model-hash 220 based on the current model 124 and then comparing that recent model-hash 220 with a previously generated model-hash 220 that was based on the version of the model 124 last seen by the initialization monitor 202.

During a database seeding step 324, an embodiment seeds a database 138 with data 216. Familiar database management system mechanisms may be used.

During a database index modifying step 326, an embodiment modifies a database 138 index 214. Familiar database management system mechanisms may be used.

During a database migrating step 328, an embodiment migrates an existing database 218 into a database 138 for the step 302 runtime use. Data 216 of the existing database may be discarded, modified, and/or retained 330. Familiar database management system mechanisms may be used.

During an initializer executing step 332, an embodiment executes a database initializer 208 which was invoked 306 by the initialization monitor 202. Familiar code execution mechanisms may be used.

During a memory configuring step 334, a memory medium 112 is configured by an initialization monitor 202, a custom database initializer 212, an initialization setting 206, or otherwise in connection with ORM database initialization as discussed herein.

During a context instance obtaining step 402, a user (or an embodiment operating on behalf of a user) obtains a data context instance 130. Step 402 may be accomplished using an IDE 134, data context 128 class instantiation, and/or other mechanisms, for example.

During a database connection specifying step 404, a user (or an embodiment operating on behalf of a user) specifies a database connection 126. Familiar database management system, network protocol, and/or other mechanisms may be used, for example.

During a model defining step 406, a user (or an embodiment operating on behalf of a user) defines an object model 124 for an application 408 whose code 120 is under development. Familiar ORM mechanisms may be used.

During a custom database initializer supplying step 410, a user (or an embodiment operating on behalf of a user) supplies an initialization monitor 202 with sufficient information for the monitor 202 to invoke 306 a custom database initializer 212. For example, mechanisms such as a path and filename, class and method names, or other addressing information, may be used.

During a use attempting step 412, a user (or an embodiment operating on behalf of a user) attempts a runtime 414 use of the step 404 connection. Familiar application launching mechanisms may be used.

During an initialization verifying step 416, a user (or an embodiment operating on behalf of a user) verifies that a database 138 has been initialized 418 as desired by a database initializer 208, or that such initialization 418 has at least been attempted (initializer code may be erroneous). Familiar mechanisms such as database management system tools for reading database content, logging database access, or debugging database access code, may be used. In particular, verifying step 416 may include tracking initialization 418 activities such as database index 214 modification 420, database 218 migration 422, and/or results 424 of seeding 324 data 216.

During an initialization setting selecting step 426, a user (or an embodiment operating on behalf of a user) selects one or more initialization settings 206 for use by an initialization monitor 202 and/or by database initializer(s) 208. Familiar user interface mechanisms may be used, adapted to display and accept settings 206 such as settings that influence or control the presence of steps 308-330 in an ORM database initialization 418.

During a default initializer overriding step 428, a user (or an embodiment operating on behalf of a user) overrides an invocation 306 of a default database initializer 210 that would otherwise occur, causing an invocation 306 of a custom database initializer 212 instead. Familiar user interface and invocation mechanisms may be used.

During a default initializer supplementing step 430, a user (or an embodiment operating on behalf of a user) supplements an invocation 306 of a default database initializer 210, causing in addition an invocation 306 of a custom database initializer 212. Familiar user interface and invocation mechanisms may be used.

The foregoing steps and their interrelationships are discussed in greater detail below, in connection with various embodiments.

Some embodiments provide a process for database initialization, which is described now from a computer process perspective, consistent with FIG. 3. The process includes automatically detecting 302 an attempted first runtime use 304 of a particular database connection 126 with a particular data context instance 130 and a particular object model 124 of an application. In response to detecting such a use 304, the process automatically invokes 306 a database initializer.

In some embodiments, the invoked 306 database initializer 208 automatically checks 308 to see whether a database 138 exists for the particular database connection. In some of these embodiments, the invoked database initializer 208 determines 310 that no database exists for the particular database connection, and automatically generates 312 a database and schema which are compatible with the particular object model 124.

In some embodiments, the invoked 306 database initializer 208 automatically ascertains 314 whether a database and schema for the particular database connection are compatible with the particular object model. In some of these embodiments, the invoked database initializer ascertains 314 that the database and schema for the particular database connection are not compatible with the particular object model, and in response automatically deletes 318 the database and schema and generates 312, 320 a replacement database and schema which are compatible with the particular object model.

In some embodiments, the invoked 306 database initializer 208 automatically deletes 318 a database and schema for the particular database connection and generates 312, 320 a replacement database and schema which are compatible with the particular object model. Note that deletion in these embodiments is not necessarily preceded by ascertaining 314 incompatibility, but may be thus preceded.

In some embodiments, the invoked 306 database initializer 208 automatically deletes 318 a database and schema for the particular database connection without (i.e., skipping 316) ascertaining whether the database and schema are compatible with the particular object model, and generates 312, 320 a replacement database and schema which are compatible with the particular object model.

In some embodiments, the invoked 306 database initializer 208 finds 322 that the particular object model has changed from the last time the initializer ran, and automatically deletes 318 a database and schema for the particular database connection, and generates 312, 320 a replacement database and schema which are compatible with the changed object model.

In some embodiments, the invoked 306 database initializer 208 automatically seeds 324 data into a database for the particular database connection. In some, the invoked database initializer modifies 326 an index 214 of a database. In some, the invoked database initializer migrates 328 an existing database and schema to match the data model, and in some of these also retains 330 the existing data in the resulting migrated database.

In some embodiments, the invoked database initializer 208 is a custom initializer 212 in that it executes 332 code supplied by a developer 104 of the particular object model 124. In some, a default database initializer 210 is executed 332.

We turn now to discussion of embodiments a developer may perform for database initialization, consistent with FIG. 4. Some embodiments include obtaining 402 a data context instance 130, specifying 404 a database connection 126, defining 406 an object model 124 of an application, and supplying 410 a custom database initializer 212; a default initializer 210 may or may not also be present. The process further includes attempting 412 a runtime use 304 of the database connection with the data context instance and the object model, and then verifying 416 that a database for the database connection has been automatically initialized 418 by the custom database initializer.

In some embodiments, the verifying step verifies 416 that the database has been initialized based on at least one of the following: a modification 420 of an index of the database, a migration 422 of an existing database and schema into the database, a result 424 of seeding data into the database.

In some embodiments, the process includes the developer selecting 426 at least one of the following settings 206: automatically generate 312 a database if no database exists for the connection; automatically generate 312 a replacement database if no database compatible with the object model exists for the connection; automatically unconditionally delete 318 and regenerate 320 the database.

In some embodiments, supplying 410 a custom database initializer overrides 428 a default initializer, and in others supplying the custom initializer supplements 430 a default initializer.

Configured Media

Some embodiments include a configured computer-readable storage medium 112. Medium 112 may include disks (magnetic, optical, or otherwise), RAM, EEPROMS or other ROMs, and/or other configurable memory devices, as opposed to wires and other propagated signal media. The storage medium which is configured may be in particular a removable storage medium 114 such as a CD, DVD, or flash memory. A general-purpose memory, which may be removable or not, and may be volatile or not, can be configured into an embodiment using items such as an initialization monitors 202, custom initializers 212 and initialization settings 206, in the form of data 118 and instructions 116, read from a removable medium 114 and/or another source such as a network connection, to form a configured medium. The configured medium 112 is capable of causing a computer system to perform process steps for transforming data through ORM database initialization as disclosed herein. FIGS. 1 through 4 thus help illustrate configured storage media embodiments and process embodiments, as well as system and process embodiments. In particular, any of the process steps illustrated in FIG. 3 and/or FIG. 4, or otherwise taught herein, may be used to help configure a storage medium to form a configured medium embodiment.

ADDITIONAL EXAMPLES

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing technological context and/or by illustrating some of the many possible implementations and developer utilizations of the initialization monitor 202, initialization setting 206, and database initializer 208 technology discussed herein.

The following discussion is derived from Entity Framework documentation. Entity Framework includes software implemented by Microsoft Corporation. Aspects of the Entity Framework software and/or documentation are consistent with or otherwise illustrate aspects of the embodiments described herein. However, it will be understood that Entity Framework documentation and/or implementation choices do not necessarily constrain the scope of such embodiments, and likewise that Entity Framework and/or its documentation may well contain features that lie outside the scope of such embodiments. Nor is any released or development version of Entity Framework necessarily consistent with the documentation below. It will also be understood that the discussion below is provided in part as an aid to readers who are not necessarily of ordinary skill in the art, and thus may contain and/or omit details whose recitation below is not strictly required to support the present disclosure.

In some approaches, a System.Data.Entity.Database namespace contains database related components including connection factory and database initialization components. These are classes that a user could interact directly with but are more advanced and not necessarily used in every application.

Some approaches provide a set of components used to locate a database for a context and to initialize that database with a schema and seed data. These components may be used when working in a Code First development pattern but they might also be leveraged for models that are defined in edmx (i.e. Database or Model First development). This functionality has a default behavior designed to get developers up and running as quickly and easily as possible but with an easy learning curve as they want to control more of the behavior and ultimately deploy their application targeting a production database.

Database Location

If a DbConnection or ObjectContext are passed to the DbContext during construction, these explicitly point to a database. If no additional information is supplied other than defining a derived DbContext and calling the default constructor then the fully qualified name of the context type is used to locate a database. First the app/web.config file is checked to see if there is an entry with the same name as the context (either fully qualified or not), if one is present then this is used for the database connection. Note that this can be either a normal database connection string or an Entity Framework (EF) connection string. In the case that an EF connection string is provided the metadata section can also be used for model discovery. If no config file entry is found then the fully qualified name of the derived context type is passed to a default connection factory. By default this will return a connection to a database on .\SQLEXPRESS with the same name as the context type. If a constructor is used that supplies a nameOrConnectionString argument then the same process described above is used but this supplied string is used in place of the fully qualified name of the derived context type. If the nameOrConnection string value is specified in the "name=xxx" format then the 'xxx' section of the string will be used to find a connection string in the app/web.config file, if no entry is found then an exception is thrown.

Database Initialization

Once a database 138 has been located (that is, once the expected location is determined) the database may or may not exist and may or may not be compatible with the current model 124. This typically only applies to Code First development but may be used with Database and Model First as well. Some approaches include a set of helpers to discover the state of the database and create (i.e., generate 312) a schema that matches the model. There is also a hook that allows developers to include some custom logic (i.e., custom database initializer 212) to be run for a given context the first time it is used in an AppDomain. Building on top of these two components, some approaches include a set of default strategies (i.e., default initializer 210 and/or settings 206) that can be plugged in for a context.

EdmMetadata Table

To help ascertain 314 whether the model matches the database schema or not, in some approaches the stack will include an extra EdmMetadata table in the user's database that stores a hash 220 of the database section of the model. This can be turned off via the ModelBuilder.IncludeMetadataInDatabase property.

DbDatabase Type

In some approaches, a Database class is used to encapsulate methods and properties that relate to the underlying relational database 138. Database is not publicly constructible and is obtained from a context. Database also contains some static members that do not require a context instance 130 to function. The members on Database are not typically used in all applications 408, so they are not exposed on the root API surface. The members are building blocks and are used in database initialization logic.

Members Include:

| Member | Purpose |
|---|---|
| Properties | |
| public DbConnection Connection { get; } | Gets the connection to the underlying database. This is useful for developers who want to run some custom logic that does not involve EF but targets the underlying database. |

-continued

| Member | Purpose |
|---|---|
| public static IDbConnectionFactory DefaultConnectionFactory { get; set; } | Gets or sets the connection factory that is used for all contexts in this AppDomain. This makes it easy to swap out the default connection factory (SQL Client against .\SQLEXPRESS) for another provider, say SQL CE. |
| | Methods |
| public void Create( ) | Creates the database for the model backing the context, using the database connection. If the database already exists then it will throw. This is typically used to create (i.e., generate 312) a database from a Code First model but can still be used with a model read from edmx metadata. |
| public bool CreateIfNotExists( ) | Similar to the above method but if the database already exists it is a no-op. Note that no effort is made to ensure the database schema matches the model. |
| public void Delete( ) | Deletes 318 the database pointed to by the database connection. If the database does not exist then this operation is a no-op. This is typically used prior to calling Create( ) in Code First scenarios but again it can be used in any development pattern. |
| public static void Delete(DbConnection existingConnection) | As above but can be used without the need to create a context as no model is required to delete a database. |
| public static void Delete(string nameOrConnectionString) | As above but the connection 126 is found using the default connection factory, or a connection string in the app/web.config file with a name matching the supplied string. |
| public bool Exists( ) | Determines if the database connection 126 for the current context 128 points to an existing database. |
| public static bool Exists(DbConnection existingConnection) | As above but can be used without the need to create a context as no model is required to delete a database. |
| public static bool Exists(string nameOrConnectionString) | As above but the connection is found using the default connection factory, or a connection string in the app/web.config file with a name matching the supplied string. |
| public void Initialize(bool force) | Will ensure the initialization routine for this context has been run. If true is passed for the 'force' parameter then the initialization routine (i.e., initializer 208) will run again even if it has already been run in this AppDomain. |
| public bool CompatibleWithModel( ) | Determines if the database schema 140 matches the current model 124. This is performed using the EdmMetadata Table from the database. If the metadata table has been excluded from the database then an exception is thrown. This is typically used as a decision point when initializing 418 a database to determine if any changes need to be made. |
| public static void SetInitializer<TContext>( IDatabaseInitializer<TContext> strategy) | Sets the initializer to be used for the given context type in the current AppDomain. |

IDbConnectionFactory & Implementations

In some approaches, IDbConnectionFactory is used to turn a database name into a full database connection 126. Its primary use is to turn the fully qualified derived context type name into a database connection. There is a default connection factory for each AppDomain that can be set via Database.DefaultConnectionFactory. As an example, if you wanted to change all contexts to use SQL CE by default you would have the following code execute prior to constructing any contexts in you AppDomain:
Database.DefaultConnectionFactory=new SqlCeConnectionFactory("System.Data.SqlServerCe.4.0");

Because the setting is AppDomain wide it can be changed by different applications 408 that consume the same context, for example your application may target a full SQL Client database but you may want to swap to SQL CE for your unit test project.

Members:

| Member | Purpose |
|---|---|
| | Methods |
| DbConnection CreateConnection(string nameOrConnectionString) | Turns the supplied name into a full database connection 126. This is typically called by the stack and not developers; developers would implement this member if they want custom logic to turn a context name into a database connection. |

SqlConnectionFactory Type

This is a SQL Client implementation of IDbConnectionFactory, by default it uses .\SQLEXPRESS with integrated security and MARS enabled and uses the supplied database name as the actual database name. These defaults can be changed by specifying explicit parts of the connection string in the constructor. For example to connect to a different server you could register the following:
Database.DefaultConnectionFactory=new SqlConnectionFactory("Server=10.1.1.1");
Members:

| Member | Purpose |
|---|---|
| Constructors | |
| public SqlConnectionFactory( ) | Creates a new factory with the default settings. This would not usually be called by developers 104 because this is what is assigned to Database.DefaultConnectionFactory by default. |
| public SqlConnectionFactory(string baseConnectionString) | Creates a new factory with some or all of the default settings overridden. This would be used to change the server, login credentials etc. |
| Properties | |
| public string BaseConnectionString { get; } | Gets the settings that have been overridden for this factory. |
| Methods | |
| public DbConnection CreateConnection(string nameOrConnectionString) | Creates a connection 126 based on the specified settings. Generally not called by a developer but by the framework to get a connection for a given context. |

SqlCeConnectionFactory Type

This is similar to the SqlConnectionFactory but uses the SQL Compact provider. Because SQL compact providers are not backwards compatible you specify the invariant name of the provider you wish to use.

By default database files are specified in the |AppData| directory, which equates to the 'bin' directory for executables and 'App_Data' for web applications. This can be changed by specifying a database path in the constructor.
Members:

| Member | Purpose |
|---|---|
| Constructors | |
| public SqlCeConnectionFactory(string providerInvariantName) | Creates a new factory with the default settings. This would typically be called by developers who just want to swap their entire application 408 to use SQL Compact. A common use for this would be to swap to compact in a unit test project. |
| public SqlCeConnectionFactory(string providerInvariantName, string databaseDirectory, string baseConnectionString) | As above but allows the directory that database 138 files are located in to be changed along with any other parts of the connection string. |
| Properties | |
| public string BaseConnectionString { get; } | Gets the settings that have been overridden for this factory. |

-continued

| Member | Purpose |
|---|---|
| public string DatabasePath { get; } | Gets the directory that database files will be located in. |
| public string ProviderInvariantName { get; } | Gets the provider invariant being used. |
| Methods | |
| public DbConnection CreateConnection(string nameOrConnectionString) | Creates a connection based on the specified settings. Generally not called by a developer but by the framework to get a connection for a given context. |

IDatabaseIntializer<TContext> & Implementations

IDatabaseInitializer is used to represent a set of logic that should be used to initialize 418 the database 138 for a given context. The execution of these initializers is taken care of by the stack the first time a context of each type is used within an AppDomain. By default all contexts are assigned the CreateDatabaseOnlyIfNotExists<TContext> strategy (i.e., initializer 210) but this can be changed via the Database.SetInitializer<TContext> method. Because the setting is AppDomain wide it can be changed by different applications 408 that consume the same context 128. For example you could use the default strategy in your end user application but chose to always recreate (i.e., regenerate 320) the database before each test run in your test project:
Database.SetInitializer<MyContext>(new AlwaysRecreateDatabase<MyContext>( );

Database initialization can be turned off for a context by registering null:
Database.SetInitializer<MyContext>(null);
Members:

| Member | Purpose |
|---|---|
| Methods | |
| void InitializeDatabase(TContext context) | Initializes 418 the database backing the supplied context. Having the context allows logic to make use of the helper methods from DbContext.Database and can also use the context to insert any seed data 216. Because the underlying connection is available the logic can always bypass EF and run directly against the database. Inserting data into the context (or using the context for any other operations) does not have any side effects on other context instances 130 constructed by the user 104 (i.e., no entities are attached to an instance the user created) |

CreateDatabaseOnlyIfNotExists<TContext>

This is the default strategy (default initializer 210) for all contexts and will create (generate 312) the database 138 if it does not exist. If the database exists but the embodiment ascertains 314 that the model 124 does not match the schema 140 then an exception will be thrown. If the metadata table was excluded from the model 124 or the user 104 is mapping to an existing database 138 that does not contain the metadata table then no attempt is made to ascertain whether the schema matches and EF will fail at runtime if the schema is not as expected.

Members:

| Member | Purpose |
|---|---|
| Constructors | |
| public CreateDatabaseOnlyIfNotExists( ) | As discussed elsewhere. |
| Methods | |
| public override void InitializeDatabase(TContext context) | Takes care of checking if the database exists and creating it if not. Generally not called by a developer but by the framework to perform initialization 418. |
| protected virtual void Seed(TContext context) | A stub method that is called during the initialization process at the appropriate time to insert (seed 324) seed data 216. This allows a user to derive from this class and specify some data 216 that should be inserted when the database 138 is created using the context. |

RecreateDatabaseIfModelChanges<TContext>

This strategy checks if the model has changed and will drop and recreate the database if it has (delete 318 and generate 320 replacement database 138). If the metadata table was excluded from the schema then this strategy cannot be used and will throw.

Members:

| Member | Purpose |
|---|---|
| Constructors | |
| public RecreateDatabaseIfModelChanges( ) | As discussed. |
| Methods | |
| public override void InitializeDatabase(TContext context) | Takes care of checking if the database is compatible (ascertaining 314) with the current model and recreating it if not. Generally not called by a developer but by the framework to perform initialization. |
| protected virtual void Seed(TContext context) | A stub method that is called during the initialization process at the appropriate time to insert seed data. This allows a user to derive from this class and specify some data that should be inserted when the database is created using the context. |

AlwaysRecreateDatabase<TContext>

This strategy always drops and recreates the database regardless of its state. This would typically be used for unit test projects where the tests are destructive and change the state of the database. This allows the database to be reset to a known state prior to each run.

Members:

| Member | Purpose |
|---|---|
| Constructors | |
| public AlwaysRecreateDatabase( ) | Nothing noteworthy here. |
| Methods | |
| public override void InitializeDatabase(TContext context) | Takes care of dropping the database if it exists and recreating it. Generally not called by a developer but by the framework to perform initialization. |
| protected virtual void Seed(TContext context) | A stub method that is called during the initialization process at the appropriate time to insert seed data. This allows a user to derive from this class and specify some data that should be inserted when the database is created using the context. |

Another View of ORM Database Initialization

The following discussion is based on published commentary by an inventor. This discussion further illustrates features which may be of interest. As with the foregoing, a particular embodiment, implementation, or product will not necessarily conform with the specific details presented here.

Creating a DbContext Instance

Not very much happens when the context instance 130 is created. The initialization is mostly lazy so that if you never use the instance, then you pay very little cost for creating the instance. It's worth noting that SaveChanges on an un-initialized context will also not cause the context to be initialized. This allows patterns that use auto-saving to be implemented very cheaply when the context has not been used and there is therefore nothing to save. One thing that does happen at this stage is that the context is examined for DbSet properties and these are initialized to DbSet instances if they have public setters. This stops you getting null ref exceptions when you use the sets but still allows the sets to be defined as simple automatic properties. The delegates used to do this are cached.

DbContext Initialization

The context 128 is initialized when the context instance 130 is used for the first time. "Use" in this sense means any operation on the context that requires database access or use of the underlying Entity Data Model (EDM).

The context initialization steps are:
1. The context tries to find a connection or connection string:
   a. If a DbConnection was passed to the constructor, then this is used.
   b. Else, if a full connection string was passed, then this is used.
   c. Else, if the name of a connection string was passed and a matching connection string is found in the config file, then this is used.
   d. Else, the database name is determined from the name passed to the constructor or from the context class name and the registered IConnectionFactory instance is used to create a connection by convention.
2. The connection string is examined to see if it is an Entity Framework connection string containing details of an EDM to use or if it is a raw database connection string containing no model details.
   a. If it is an EF connection string, then an underlying ObjectContext is created in Model First/Database First mode using the EDM (the CSDL, MSL, and SSDL from the EDMX) in the connection string.
  b. If it a database connection string, then the context enters Code First mode and attempts to build the Code First model as described in the next section.

Building the Code First Model

The EDM used by Code First for a particular context type is cached in the app-domain as an instance of DbCompiledModel. This caching ensures that the full Code First pipeline for building a model only happens once when the context is used for the first time.

Therefore, when in Code First mode:
1. DbContext checks to see if an instance of DbCompiledModel has been cached for the context type. If the model is not found in the cache, then:
  a. DbContext creates a DbModelBuilder instance.
    i. By default, the model builder convention set used is Latest. A specific convention set can be used by setting the DbModelBuilderVersionAttribute on your context.
  b. The model builder is configured with each entity type for which a DbSet property was discovered.
    i. The property names are used as the entity set names, which is useful when you're creating something like an OData feed over the model
  c. The IncludeMetadataConvention convention is applied to the builder. This will include the EdmMetadata entity in the model unless the convention is later removed.
  d. The ModelContainerConvention and ModelNamespaceConvention are applied to the builder. These will use the context name as the EDM container name and the context namespace as the EDM namespace. Again, this is useful for services (like OData) that are based on the underlying EDM.
  e. OnModelCreating is called to allow additional configuration of the model.
  f. Build is called on the model builder.
    i. The model builder builds an internal EDM model representation based on configured types and reachability from those types and runs all the Code First conventions which further modify the model/configuration.
      1. The connection is used in this process since the SSDL part of the model depends on the target database, as represented by the provider manifest token.
  g. Compile is called on the DbModel to create a DbCompiledModel. DbCompiledModel is currently a wrapper around the MetadataWorkspace.
    i. The model hash is also created by the call to compile.
  h. The DbCompiledModel is cached.
2. The DbCompiledModel is used to create the underlying ObjectContext instance.

Database Initialization

At this point we have an underlying ObjectContext, created either through Code First or using the EDM in the connection string. DbContext now checks whether or not database initialization 418 has already happened in the app-domain for the type of the derived DbContext in use and for the database connection 126 specified.

If initialization has not yet happened, then:
1. DbContext checks whether or not an IDatabaseInitializer instance (inititalizer 208) has been registered for the context type.
  a. If no initializer (including null) has been explicitly registered then a default initializer will be automatically registered.
    i. In Code First mode, the default initializer 210 is CreateDatabaseIfNotExists.
    ii. In Database/Model First mode, the default initializer is null, meaning that no database initialization 418 will happen by default. (Because your database almost always already exists in Database/Model First mode.)
2. If a non-null initializer has been found, then:
  a. A temporary ObjectContext instance is created that is backed by the same EDM as the real ObjectContext. This temp is used by the DbContext instance 130 for all work done by the initializer and then thrown away. This ensures that work done in the initializer does not leak into the context later used by the application 408.
  b. The initializer 208 is run. Using the Code First default CreateDatabaseIfNotExists as an example, this does the following:
    i. A check 308 is made to see whether or not the database already exists.
    ii. If the database does not exist, then it is created (generated 312):
      1. This happens through the CreateDatabase functionality of the EF provider. Essentially, the SSDL of the model is the specification used to create DDL for the database schema which is then executed.
        a. If the EdmMetadata entity was included in the model, then the table for this is automatically created at the same time since it is part of the SSDL just like any other entity.
      2. If the EdmMetadata entity was included in the model, then the model hash 220 generated by Code First is written to the database by saving an instance of EdmMetadata.
      3. The Seed 324 method of the initializer is called.
      4. SaveChanges is called to save changes made in the Seed method.
    iii. If the database does exist, then a check is made to see if the EdmMetadata entity was included in the model and, if so, whether there is also a table with a model hash in the database.
      1. If EdmMetadata is not mapped or the database doesn't contain the table, then it is assumed that the database matches the model. This is what happens when you map to an existing database, and in this case it is up to you to ensure that the model matches the database. (Note DropCreateDatabaseIfModelChanges would throw in this situation.)
      2. Otherwise, the model hash in the database is compared to the one generated by Code First. If they don't match, then an exception is thrown. (DropCreateDatabaseIfModelChanges would drop, recreate, and re-seed the database in this situation.)
  c. The temporary ObjectContext is disposed.
3. Control returns to whatever operation it was that caused initialization to run.

Conclusion

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 and 4 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer system comprising:
   a logical processor;
   a memory in operable communication with the logical processor;
   a data context instance residing in the memory;
   a database connection residing in the memory;
   an object model residing in the memory, the object model mapped by an object-relational mapper; and
   an initialization monitor residing in the memory and having code which upon execution monitors for a first attempted use at runtime of the database connection with the data context instance and the object model.

2. The system of claim 1, wherein the system further comprises a database initializer which resides in the memory and is invocable by the initialization monitor.

3. The system of claim 2, wherein the database initializer comprises a default initializer that is free of code supplied by a developer of the object model.

4. The system of claim 2, wherein the database initializer comprises a custom initializer that contains code supplied by a developer of the object model.

5. The system of claim 1, wherein the system further comprises at least one of the following residing in the memory: a model-hash of at least a portion of the object model, a schema-hash of at least a portion of a schema of a database.

6. A computer-readable storage medium configured with data and with instructions that when executed by at least one processor causes the processor(s) to perform a process for database initialization, the process comprising the steps of:
   automatically detecting an attempted first runtime use of a particular database connection with a particular data context instance and a particular object model of an application; and in response
   automatically invoking a database initializer.

7. The configured medium of claim 6, wherein the invoked database initializer automatically checks to see whether a database exists for the particular database connection.

8. The configured medium of claim 7, wherein the invoked database initializer determines that no database exists for the particular database connection, and automatically generates a database and schema which are compatible with the particular object model.

9. The configured medium of claim 6, wherein the invoked database initializer automatically ascertains whether a database and schema for the particular database connection are compatible with the particular object model.

10. The configured medium of claim 9, wherein the invoked database initializer ascertains that the database and schema for the particular database connection are not compatible with the particular object model, and in response automatically deletes the database and schema and generates a replacement database and schema which are compatible with the particular object model.

11. The configured medium of claim 6, wherein the invoked database initializer automatically deletes a database and schema for the particular database connection and generates a replacement database and schema which are compatible with the particular object model.

12. The configured medium of claim 6, wherein the invoked database initializer automatically deletes a database and schema for the particular database connection without ascertaining whether the database and schema are compatible with the particular object model, and generates a replacement database and schema which are compatible with the particular object model.

13. The configured medium of claim 6, wherein the invoked database initializer finds that the particular object model has changed from the last time the initializer ran, and automatically deletes a database and schema for the particular database connection, and generates a replacement database and schema which are compatible with the changed object model.

14. The configured medium of claim 6, wherein the invoked database initializer automatically seeds data into a database for the particular database connection.

15. The configured medium of claim 6, wherein the invoked database initializer performs at least one of the following:

modifies an index of a database;

migrates an existing database and schema to match the data model and retain the existing data.

16. The configured medium of claim 6, wherein the invoked database initializer executes code supplied by a developer of the particular object model.

17. A developer process for database initialization, comprising the steps of:
    obtaining a data context instance;
    specifying a database connection;
    defining an object model of an application;
    supplying a custom database initializer;
    attempting a runtime use of the database connection with the data context instance and the object model; and
    verifying that a database for the database connection has been automatically initialized by the custom database initializer.

18. The process of claim 17, wherein the verifying step verifies that the database has been initialized based on at least one of the following:

a modification of an index of the database;

a migration of an existing database and schema into the database;

a result of seeding data into the database.

19. The process of claim 17, wherein the process further comprises the developer selecting at least one of the following settings:

automatically generate a database if no database exists for the connection;

automatically generate a replacement database if no database compatible with the object model exists for the connection;

automatically unconditionally delete and regenerate the database.

20. The process of claim 17, wherein supplying a custom database initializer overrides a default initializer.

* * * * *